US011487621B1

(12) United States Patent
Montero et al.

(10) Patent No.: US 11,487,621 B1
(45) Date of Patent: Nov. 1, 2022

(54) LINKING EMBEDDED CONTROLLER WITH MEMORY REFERENCE CODE AND SYSTEM BIOS SHADOWING

(71) Applicant: Dell Products L.P., Round Rock, TX (US)

(72) Inventors: Adolfo Montero, Pflugerville, TX (US); Michael Arms, Pflugerville, TX (US); Balasingh P. Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/244,624

(22) Filed: Apr. 29, 2021

(51) Int. Cl.
*G06F 11/14* (2006.01)
*G06F 11/27* (2006.01)
*G06F 21/54* (2013.01)
*G06F 11/07* (2006.01)
*G06F 21/57* (2013.01)
*G06F 11/30* (2006.01)

(52) U.S. Cl.
CPC ...... *G06F 11/1417* (2013.01); *G06F 11/0772* (2013.01); *G06F 11/27* (2013.01); *G06F 11/3037* (2013.01); *G06F 21/54* (2013.01); *G06F 21/575* (2013.01)

(58) Field of Classification Search
CPC .. G06F 11/1417; G06F 11/0772; G06F 11/27; G06F 11/3037; G06F 21/54; G06F 21/575
See application file for complete search history.

(56) References Cited

U.S. PATENT DOCUMENTS

| 5,793,943 A | * | 8/1998 | Noll | G06F 11/20 714/48 |
| 8,788,883 B2 | * | 7/2014 | Wang | G06F 11/0751 714/36 |
| 10,242,197 B2 | * | 3/2019 | Zander | G06F 21/577 |
| 2012/0191964 A1 | * | 7/2012 | Lee | G06F 11/2289 713/2 |
| 2016/0019116 A1 | * | 1/2016 | Gopal | G06F 11/1417 714/19 |

(Continued)

OTHER PUBLICATIONS

Violette, James w., "Core component choices in single-user computer systems: a home office user's perspective", University of Richmond, Master's Thesis, 1990, pp. 1-83 (Year: 1990).*

(Continued)

*Primary Examiner* — Matthew M Kim
*Assistant Examiner* — Indranil Chowdhury
(74) *Attorney, Agent, or Firm* — Jackson Walker L.L.P.

(57) ABSTRACT

An information handling system may include at least one processor, a memory, and an embedded controller (EC). The information handling system may be configured to, prior to initialization of an operating system of the information handling system: execute memory reference code configured to test selected regions of the memory; transmit results of the memory reference code to the EC; store, at the EC, information indicative of respective likelihoods that particular regions of the memory are bad; and upon a subsequent boot, select a region of the memory having a low likelihood of being bad for loading a Basic Input/Output System (BIOS) of the information handling system.

18 Claims, 4 Drawing Sheets

(56) References Cited

U.S. PATENT DOCUMENTS

| | | | |
|---|---|---|---|
| 2016/0055069 A1* | 2/2016 | Jeansonne | G06F 3/0683 714/15 |
| 2016/0055113 A1* | 2/2016 | Hodge | G06F 21/575 710/308 |
| 2016/0055338 A1* | 2/2016 | Jeansonne | G06F 3/0688 713/2 |
| 2018/0060148 A1* | 3/2018 | Rudy | G06F 11/0727 |
| 2019/0258542 A1* | 8/2019 | Chaiken | G06F 11/1068 |
| 2020/0201714 A1* | 6/2020 | Montero | G06F 8/654 |
| 2020/0258591 A1* | 8/2020 | Chaiken | G11C 7/04 |
| 2020/0310896 A1* | 10/2020 | Lee | G11C 29/44 |
| 2020/0364120 A1* | 11/2020 | Chao | G06F 9/4408 |
| 2020/0364339 A1* | 11/2020 | Chao | G06F 21/57 |
| 2020/0371694 A1* | 11/2020 | Liu | G06F 3/0659 |
| 2020/0379843 A1* | 12/2020 | Chao | G06F 11/1016 |
| 2021/0049071 A1* | 2/2021 | Suryanarayana | G06F 11/2284 |
| 2021/0149761 A1* | 5/2021 | Chao | G06F 11/1016 |
| 2021/0406143 A1* | 12/2021 | Chaiken | G06F 11/1048 |
| 2022/0156144 A1* | 5/2022 | Jang | G06F 11/1658 |

OTHER PUBLICATIONS

Micro Firmware, Inc. "What is BIOS Shadowing?", Feb. 28, 1997, www url: http://www.firmware.com/support/bios/shadow.htm, last retrieved from Internet on Mar. 11, 2022 (Year: 1997).*

* cited by examiner

LINKING EMBEDDED CONTROLLER WITH MEMORY REFERENCE CODE AND SYSTEM BIOS SHADOWING

TECHNICAL FIELD

The present disclosure relates in general to information handling systems, and more particularly to the use of an embedded controller pre-boot operations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, a pre-boot environment of an information handling system may load its code into a memory region at a predefined, fixed memory address. Further, the pre-boot environment typically always allocates stack and/or heap memory regions at the same memory locations. Any memory failures in any of these RAM regions will typically result in no-POST boot failures.

For purposes of this disclosure, the term "pre-boot environment" may refer generally to platforms such as a Basic Input/Output System (BIOS), a Unified Extensible Firmware Interface (UEFI), etc.

The memory initialization that takes place upon boot is dependent on the memory reference code (MRC) of the pre-boot environment. MRC refers generally to code that executes in the pre-boot environment to initialize the system RAM, adjust memory timings, etc.

Currently, the MRC itself may fail if there is a bad memory module (e.g., DIMM), resulting in a no-POST system hang (e.g., with a blinking error light indicating that a memory issue was detected). Because of severe constraints in the early pre-boot code running out of the processor's "cache as RAM" model, it is currently hard to make any optimizations to the MRC to avoid training on a bad memory region, or to avoid training on bad memory modules altogether.

When dealing with very early MRC code and the BIOS loading (shadowing) into its memory regions (e.g., after MRC has completed), there is a need for enhanced processing to improve memory error handling.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing pre-boot operations for information handling systems may be reduced or eliminated.

In accordance with embodiments of the present disclosure, an information handling system may include at least one processor, a memory, and an embedded controller (EC). The information handling system may be configured to, prior to initialization of an operating system of the information handling system: execute memory reference code configured to test selected regions of the memory; transmit results of the memory reference code to the EC; store, at the EC, information indicative of respective likelihoods that particular regions of the memory are bad; and upon a subsequent boot, select a region of the memory having a low likelihood of being bad for loading a Basic Input/Output System (BIOS) of the information handling system. In accordance with these and other embodiments of the present disclosure, a method may include an information handling system that comprises a memory and an embedded controller (EC) executing memory reference code configured to test selected regions of the memory; the information handling system transmitting results of the memory reference code to the EC; the information handling system storing, at the EC, information indicative of respective likelihoods that particular regions of the memory are bad; and upon a subsequent boot, the information handling system selecting a region of the memory having a low likelihood of being bad for loading a Basic Input/Output System (BIOS) of the information handling system.

In accordance with these and other embodiments of the present disclosure, an article of manufacture may include a non-transitory, computer-readable medium having computer-executable code thereon that is executable by a processor of an information handling system for: executing memory reference code configured to test selected regions of a memory of the information handling system; transmitting results of the memory reference code to an embedded controller (EC) of the information handling system; storing, at the EC, information indicative of respective likelihoods that particular regions of the memory are bad; and upon a subsequent boot, selecting a region of the memory having a low likelihood of being bad for loading a Basic Input/Output System (BIOS) of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), a remote access controller (e.g., a Dell Remote Access Controller (DRAC) or Integrated Dell Remote Access Controller (iDRAC)), or an embedded controller (EC).

Figure 1:
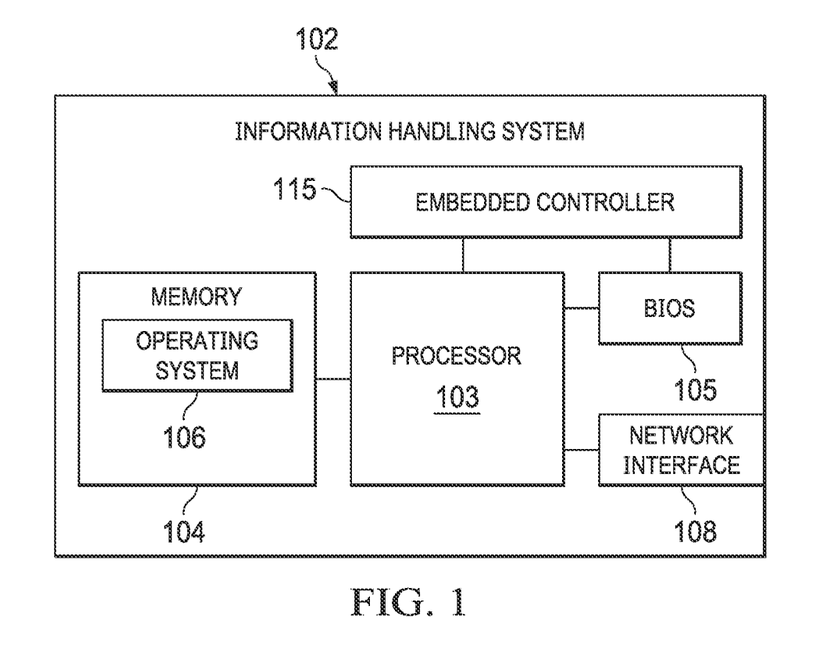
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may further include a management controller such as embedded controller (EC) 115. EC 115 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. EC 115 may be configured to provide management functionality for the management of information handling system 102. Such management may in some embodiments be made by EC 115 even if information handling system 102 is powered off or powered to a standby state. EC 115 may include a processor, a memory, and a network interface that may be separate from and physically isolated from network interface 108 in some embodiments. EC 115 may be coupled to a management network, which may be separate from and physically isolated from the data network coupled to network interface 108.

In some embodiments, EC 115 may be a microcontroller with its own memory, and it may be used to manage any of various low-level system tasks within information handling system 102.

EC 115 may be communicatively coupled to processor 103, BIOS 105, and/or any other suitable components of information handling system 102, for example via a Universal Serial Bus (USB), System Management Bus (SMBus), and/or one or more other communications channels. As discussed in more detail below, EC 115 may be used in some embodiments to increase the reliability of pre-boot operations of information handling system 102.

In some embodiments, the ability to access EC 115 in the pre-boot and/or early boot phase as a fully initialized co-processor to help improve UEFI firmware load operations and optimize MRC operation at a time when processor 103 is running in a constrained environment (e.g., in cache-as-RAM mode) may be leveraged to allow several improvements on existing solutions.

When new memory modules are inserted, EC 115 may be updated with the new memory test results (e.g., including during the factory first-boot procedure).

EC 115 may manage and track memory regions as passing or failing tests. The results may be used both by BIOS shadowing, as well as allowing the MRC to skip training in the future on known-bad regions. Further, memory training values generated by the MRC can be saved by EC 115 to avoid having to re-train the memory on subsequent boots (e.g., if no memory module changes have occurred). Thus in addition to the other advantages of this disclosure, boot time may be reduced in some embodiments.

In some embodiments, EC 115 can determine memory regions for BIOS 105 to use (e.g., for BIOS code shadowing, stack, and heap) based on known-good memory regions rather than using hard-coded regions. For example, the regions that have passed a test most recently may be the most desirable for such use. Regions that have passed a test but not recently may be less desirable. Regions that have not been tested may be still less desirable. Regions that have failed a test may be least desirable of all.

Upon MRC failure for a new memory module, EC 115 may track the memory regions that did succeed in training via live updates as the MRC progresses through the regions. Thus if the MRC hangs or fails, EC 115 may keep track of where the fault occurred, allowing the MRC to skip bad regions in the next boot attempt.

Upon MRC success for a new memory module, all blocks may be marked as good and ready for use by BIOS 105 and/or operating system 106. Upon MRC failure for a module, but in which the MRC exits with an error code, bad blocks can be marked and sent to EC 115 to optimize on the next boot. Further, BIOS shadowing into the bad regions may thereby be avoided.

In some embodiments, EC 115 may track and/or identify memory modules based on their SPD (serial presence detect) data, with significant SPD data elements transmitted to EC 115 by the MRC. For example, in addition to timing information, the SPD may include information regarding manufacturer, part number, and serial number of each memory module.

In some embodiments, BIOS 105 may periodically re-test a small portion of the memory region (e.g., via a round-robin selection process) to ensure that a large enough safe memory region can be available for subsequent boots. BIOS 105 may then help EC 115 to update and maintain the list of healthy memory blocks for the safe memory region allocation on following boot cycles.

In some embodiments, an automatic determination may be made as to whether to boot to a full host OS or to a Service OS (e.g., Linux or any other OS having a smaller memory footprint than the full host OS) based on the amount of good memory available. For example, if a considerable amount of memory is bad and not enough functional memory is available for booting the full host OS, the system may instead boot to the Service OS. In other embodiments, the system may boot to a safe mode of the host OS that may have reduced memory requirements.

Figure 2:
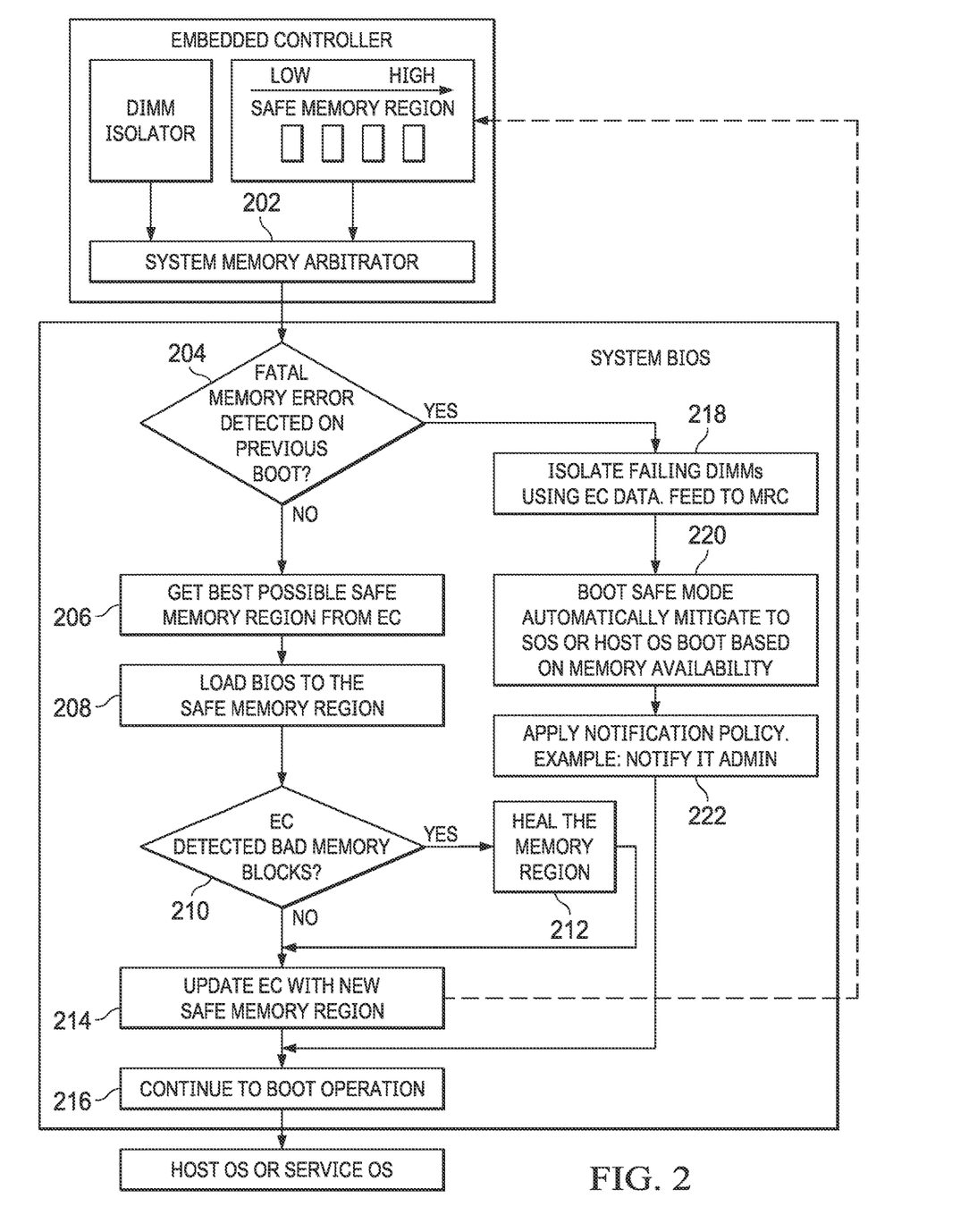
FIGS. 2-4 illustrate flow charts of methods, in accordance with embodiments of the present disclosure.

Turning now to FIG. 2, a flow chart of an example method for a pre-boot memory analysis process is shown, in accordance with some embodiments. Teachings of the present disclosure may be implemented in a variety of configurations of information handling system 102 and/or any other system operable to implement the method. In certain embodiments, the method may be implemented partially or fully in software and/or firmware embodied in computer-readable media.

At step 202, a system memory arbitrator module of the EC may receive inputs from a DIMM isolator module and a memory safety module. In particular, the DIMM isolator module may provide information about DIMMs that have previously failed testing and should not be used. The memory safety module may provide information about the relative safety of different regions of memory (e.g., from low assurance of safety to high assurance of safety). As discussed above, the memory safety evaluations may be based on how recently the different regions have been tested, what the test results were, etc.

In some embodiments, various regions of the memory may be assigned a score based on how likely the regions are to be bad. For example, the score may be a binary score with a 1 indicating a bad region and a 0 indicating a good region. In other embodiments, the score may be selected from a particular range such as 0-10, with larger numbers denoting regions that are more likely to be bad. One of ordinary skill in the art with the benefit of this disclosure will appreciate that other scoring methods may be used as desired in any particular implementation.

The scores may be stored in volatile or nonvolatile memory at the EC in a list, a map, or any other suitable data structure.

At step 204, a determination may be made regarding whether any fatal memory errors were detected on a previous boot. If not, the method may proceed to step 206, in which the best possible memory region (e.g., the region with the highest assurance of safety) is determined by the BIOS querying the EC. At step 208, the BIOS is loaded into the selected best memory region.

If any bad blocks are detected at step 210, they may be healed at step 212 (e.g., by marking them unusable, allocating a spare region of the memory module to replace the bad blocks, etc.). The EC may then be updated with information regarding the memory regions in question (e.g., by marking any bad blocks as low safety and/or marking any good blocks as high safety). The boot process may then continue at step 216, and the host OS or service OS may be loaded as appropriate.

Alternatively, if a fatal memory error was detected on a previous boot at step 204, then at step 218 any failing DIMMs may be isolated using data from the EC, and the MRC may be updated regarding such failures. At step 220, the system may boot to a safe mode, a service OS, or the host OS depending on memory availability. At step 222, a configurable notification policy may be applied, and at step 216, boot may continue.

Although FIG. 2 discloses a particular number of steps to be taken with respect to the disclosed method, the method may be executed with greater or fewer steps than those depicted in FIG. 2. In addition, although FIG. 2 discloses a certain order of steps to be taken with respect to the method, the steps may be completed in any suitable order.

Figure 3:
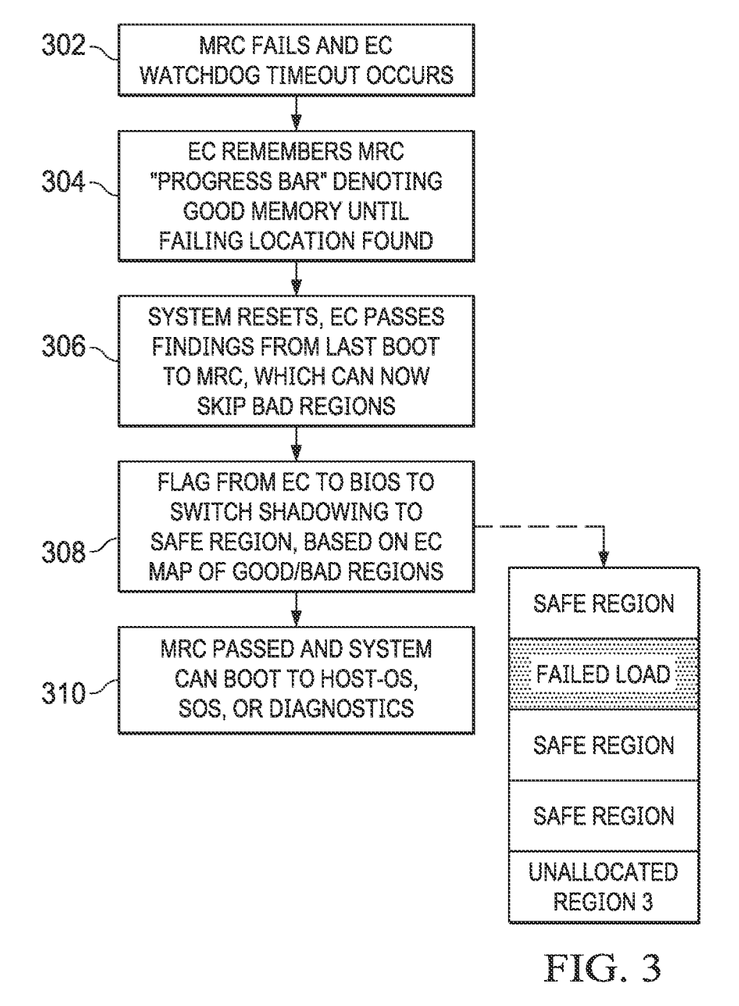

Turning now to FIG. 3, a flow chart of an example method for handling MRC memory training errors is shown, in accordance with some embodiments. Teachings of the present disclosure may be implemented in a variety of configurations of information handling system 102 and/or any other system operable to implement the method. In certain embodiments, the method may be implemented partially or fully in software and/or firmware embodied in computer-readable media.

At step 302, the MRC may fail (e.g., due to a bad memory module or a bad memory region). After a predetermined amount of time, a watchdog timer of the EC may be triggered to prevent an indefinite hang of the system.

During execution of the MRC up to the point of failure, the MRC may periodically update the EC regarding its status. Thus at step 304, the EC may determine the location or likely location of the bad memory that caused the MRC failure. At step 306, the EC may reset the system and transmit information about the failure to the MRC. The MRC may then skip the bad region.

At step 308, a flag from the EC may be set that causes the BIOS to be shadowed to a safe region instead of its default region. At step 310, MRC may complete successfully, and the system may continue boot.

FIG. 3 also shows an example map of some memory regions, indicating safe regions, unallocated regions, and failed regions.

Although FIG. 3 discloses a particular number of steps to be taken with respect to the disclosed method, the method may be executed with greater or fewer steps than those depicted in FIG. 3. In addition, although FIG. 3 discloses a certain order of steps to be taken with respect to the method, the steps may be completed in any suitable order.

Figure 4:
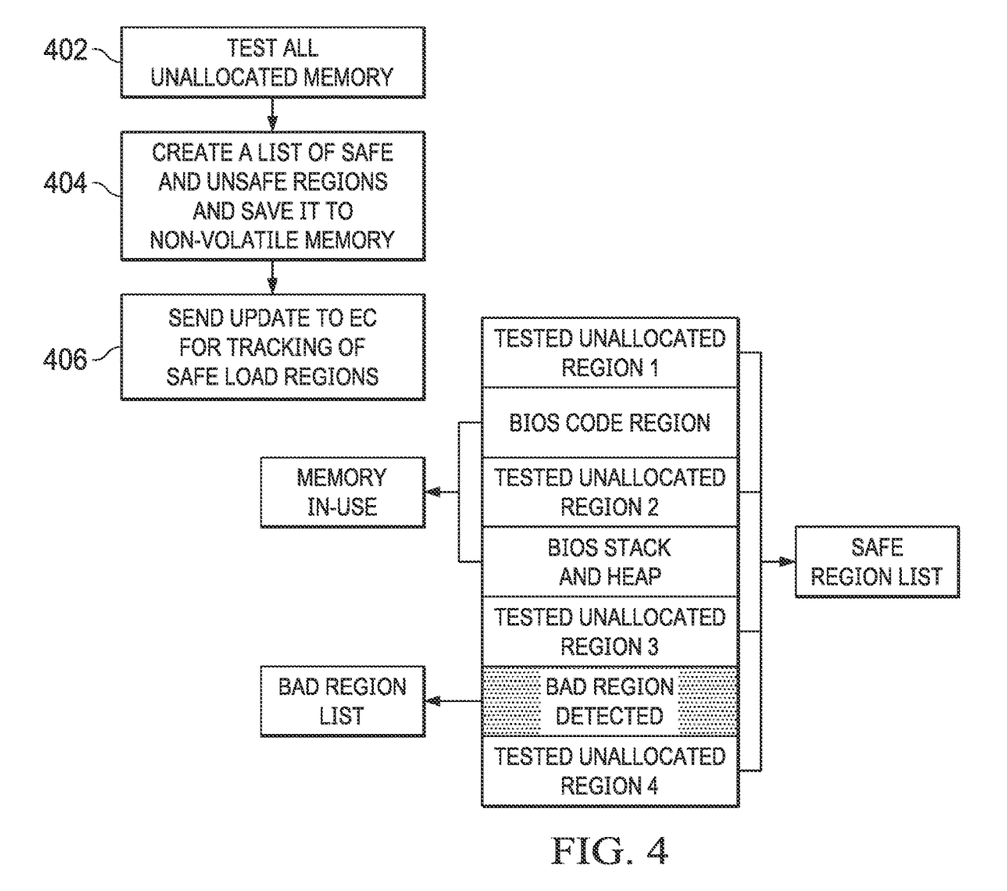

Turning now to FIG. 4, a flow chart of an example method for detecting safe memory regions is shown, in accordance with some embodiments. Teachings of the present disclosure may be implemented in a variety of configurations of information handling system 102 and/or any other system operable to implement the method. In certain embodiments, the method may be implemented partially or fully in software and/or firmware embodied in computer-readable media.

At step 402, all unallocated memory may be tested. (Regions that have been allocated typically cannot be tested with most memory testing procedures.) At step 404, a list of safe and unsafe memory regions may be created and saved to a non-volatile memory. At step 406, updates may be sent to the EC regarding the memory regions, allowing the EC to track safe regions.

FIG. 4 also shows an example memory region list, indicating which regions are safe, in-use, and bad.

Although FIG. 4 discloses a particular number of steps to be taken with respect to the disclosed method, the method may be executed with greater or fewer steps than those depicted in FIG. 4. In addition, although FIG. 4 discloses a certain order of steps to be taken with respect to the method, the steps may be completed in any suitable order.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a memory; and
   an embedded controller (EC);
   wherein the information handling system is configured to, prior to initialization of an operating system of the information handling system:
   execute memory reference code configured to test selected regions of the memory;
   transmit results of the memory reference code to the EC;
   store, at the EC, information indicative of respective likelihoods that particular regions of the memory are bad, wherein the respective likelihoods are based on a length of time that has passed since a passing test was performed on each respective particular region; and
   upon a subsequent boot, select a region of the memory having a low likelihood of being bad for loading a Basic Input/Output System (BIOS) of the information handling system.

2. The information handling system of claim 1, wherein the BIOS is a Unified Extensible Firmware Interface (UEFI) BIOS.

3. The information handling system of claim 1, further configured to:
   in response to an indication from the EC that insufficient good memory is available to load a standard host operating system, load a service operating system having a reduced memory requirement.

4. The information handling system of claim 3, further configured to apply a selected notification policy.

5. The information handling system of claim 4, wherein the selected notification policy includes sending a notification to an administrator regarding bad memory regions.

6. The information handling system of claim 1, wherein the region of memory selected for loading the BIOS is selected for loading shadowed BIOS code, a stack, and a heap.

7. A method comprising:
   an information handling system that comprises a memory and an embedded controller (EC) executing memory reference code configured to test selected regions of the memory;
   the information handling system transmitting results of the memory reference code to the EC;
   the information handling system storing, at the EC, information indicative of respective likelihoods that particular regions of the memory are bad, wherein the respective likelihoods are based on a length of time that has passed since a passing test was performed on each respective particular region; and
   upon a subsequent boot, the information handling system selecting a region of the memory having a low likelihood of being bad for loading a Basic Input/Output System (BIOS) of the information handling system.

8. The method of claim 7, wherein the BIOS is a Unified Extensible Firmware Interface (UEFI) BIOS.

9. The method of claim 7, further comprising: in response to an indication from the EC that insufficient good memory is available to load a standard host operating system, loading a service operating system having a reduced memory requirement.

10. The method of claim 9, further comprising: applying a selected notification policy.

11. The method of claim 10, wherein the selected notification policy includes sending a notification to an administrator regarding bad memory regions.

12. The method of claim 7, wherein the region of memory selected for loading the BIOS is selected for loading shadowed BIOS code, a stack, and a heap.

13. An article of manufacture comprising a non-transitory, computer-readable medium having computer-executable code thereon that is executable by a processor of an information handling system for:
   executing memory reference code configured to test selected regions of a memory of the information handling system;
   transmitting results of the memory reference code to an embedded controller (EC) of the information handling system;
   storing, at the EC, information indicative of respective likelihoods that particular regions of the memory are bad, wherein the respective likelihoods are based on a length of time that has passed since a passing test was performed on each respective particular region; and
   upon a subsequent boot, selecting a region of the memory having a low likelihood of being bad for loading a Basic Input/Output System (BIOS) of the information handling system.

14. The article of claim 13, wherein the BIOS is a Unified Extensible Firmware Interface (UEFI) BIOS.

15. The article of claim 13, wherein the code is further executable for: in response to an indication from the EC that insufficient good memory is available to load a standard host operating system, loading a service operating system having a reduced memory requirement.

16. The article of claim 15, wherein the code is further executable for applying a selected notification policy.

17. The article of claim 16, wherein the selected notification policy includes sending a notification to an administrator regarding bad memory regions.

18. The article of claim 13, wherein the region of memory selected for loading the BIOS is selected for loading shadowed BIOS code, a stack, and a heap.

* * * * *